United States Patent Office 2,819,243
Patented Jan. 7, 1958

2,819,243

METHOD OF MAKING GLASS FIBER FILLED ALKYD RESINS

Theodore C. Baker, Wayne, Ohio, assignor, by mesne assignments, to Allied Chemical & Dye Corporation, New York, N. Y., a corporation of New York No Drawing. Application October 4, 1951
Serial No. 249,814

7 Claims. (Cl. 260—40)

This invention relates to molding compositions comprising a resinous material having incorporated therein suitable fillers, including glass fibers, and to the method for making the same. In particular, the invention relates to compositions adapted for hot molding comprising a filler containing glass fibers as a substantial component and a binder which contains a polymerizable unsaturated polyester, a curing catalyst and may include a compatible polymerizable unsaturated compound.

It is known that unfilled alkyl resins can be successfully hot molded only with great difficulty. The addition of fillers of alkyd resins to enable hot molding has been suggested, and a variety of fillers have been recommended such as alpha cellulose, bleached wood pulp, barium sulfate, asbestos, powdered slate, chalk, ground glass, mica, diatomaceous earth, etc.

Fillers are known to produce desirable rheological characteristics in the molding operation, to prevent undue shrinkage in the mold, to moderate the highly exothermic polymerization reaction thereby decreasing stresses and preventing cracking during hot molding. Filled hot molded alkyd resins are known to possess good arc resistance, good dimensional stability and resistance to solvents and chemicals. However, such molding compounds have the disadvantage of low flexural, compressive, and impact strength and certain disadvantages which are characteristic of the filler added, such as, low heat and chemical resistance from cellulosic fillers, etc.

It is one of the principal objects of this invention to provide improved alkyd resin molding compositions having incorporated therewith a filler containing glass fibers as a substantial component which possess storage stability and produce markedly increased strength characteristics upon polymerization.

A further and a primary object of this invention is to provide a process by which the foregoing type of alkyd resin molding compositions may be produced.

Another object of this invention is to provide a hardened resinous article of the alkyd resin type which is characterized by improved strength, high dielectric strength, good dimensional stability, and resistance to water, solvents, and chemicals.

In general, the superior compositions of this invention may be obtained by suitably incorporating with unsaturated polyesters such, for example, as alkyd resins of the maleic type which have been modified as described more fully hereinafter, a mineral type filler containing certain glass fibers as a substantial part thereof in the presence of a polymerization catalyst. To these compositions various dyes, perfumes, or pigments may be added as desired. The resulting compositions form a heat-set product when placed in a mold and subjected to heat and pressure. Additionally, the compositions exhibit storage stability at ordinary temperatures without losing their ability to be subsequently formed and polymerized into a hard strong water-resistant article.

The binders which may be employed in accordance with this invention comprise the unsaturated polyesters which are obtained by reacting an alpha beta-unsaturated dibasic organic acid with a polyhydric alcohol. Mixtures of unsaturated polyesters and organic substances containing the polymerizably reactive groups $$CH_2=CH-CH_2-, CH_2=CH_1-$$

etc. may also be employed as well as mixtures of unsaturated polyesters and a variety of miscible liquid monomeric unsaturated polymerizable compounds. Some of the typical monomers which have been found to be useful in molding compositions include allyl esters such as diallyl phthalate, allyl esters of phosphonic acids such as diallyl phenyl phosphonate and glycol esters of acrylic and methacrylic acids, such as ethylene glycol dimethacrylate, etc.

The alpha beta-unsaturated dibasic organic acids which are preferred include maleic, fumaric, glutaconic, itaconic, mesaconic and citraconic, but maleic, itaconic and citaconic anhydrides may be used instead. Other isomers of the maleic series typified by allylmalonic, allylsuccinic, and xeronic acids may also be used satisfactorily. It is furthermore satisfactory to employ certain polybasic acids which decompose under heat to yield acids of the maleic type such as malic and citric acids. Unsaturated dibasic organic acids admixed with saturated dibasic acids such as phthalic, adipic, sebacic, etc. are similarly useful.

The polyhydric alcohols which may be used satisfactorily include dihydric alcohols and mixtures thereof, or mixtures of dihydric alcohols and small amounts of higher polyhydric alcohols. The glycols such as diethylene glycol, ethylene glycol, triethylene glycol, trimethylene glycol, monoethylin, and propylene glycol and its derivatives are generally preferred for the reason that they yield in combination with dibasic acids soluble polyesters of high molecular weight which in the presence of $CH_2=CH-CH_2-$ groups, or other polymerizable substituted-ethylene compounds, cure readily without requiring the presence of large amounts of polmerization catalysts. Examples of higher polyhydric alcohols which may be satisfactorily employed in amounts not exceeding about 5 mol percent are glycerol, pentaerythritol, mannitol, etc. Minor proportions of monohydric alcohols may also be used, but are not recommended since the formation of simple esters is undesirable.

The unsaturated alkyd resins which are preferably employed are those manufactured by standard and well known techniques having an acid number not greater than 50 although resins having an acid number as high as 100 may be useful and desirable in some cases. Generally, the acid number should be as low as possible, and particularly beneficial results have been obtained when the acid number was between 15 and 50.

The prepared maleic polyhydric alcohol ester of sufficiently low acid number, where desired, may be incorporated with a proportion of a polymerizable liquid monomeric compound such as $CH_2=CH-CH_2-$ containing compound having a B. P. of at least 80° C. which is miscible therewith. The addition of liquid monomeric compounds of the substituted-ethylene type to the unsaturated polyester makes available more polymerizable double bonds for cross linkage and consequently speeds up the required cure time, thereby decreasing the required amount of polymerization catalyst. Beneficial effects have been observed from the addition of as little as 2% substituted ethylene compound by weight of the combined resin, and monomers in proportions up to 55% by weight may be satisfactorily employed. One of the important features of this invention resides in the extension of the upper allowable limit of liquid monomeric compound which may be employed to proportions greatly in excess of the heretofore used 10% maximum, Although it is not desired to be bound by theory, it is believed that the stability of the molding compositions of this invention is preserved, in the presence of amounts of allyl esters up to 55% by weight of the combined resin, by the discontinuous character of the physical form of the material as discussed more fully hereinafter. Quantities of substituted-ethylene type monomers above 55% by weight of the total resin in the composition begin to undesirably dominate the curing characteristics of the resin and are not recommended.

The composition of this invention is obtained by adding to the above described binder a catalyst and a filler of the mineral type such as clay, talc, mica or anthophyllite and glass fibers in the approximate percentages by weight indicated below:

|  | Percent | Preferred, Percent |
| --- | --- | --- |
| Resin binder | 20-50 | 30-40 |
| Clay filler | 15-50 | 20-40 |
| Glass fibers | 20-60 | 30-40 |

In order to insure a sufficient quantity of binder to coat the surface of the glass fibers used, it is preferred that the amount of binder present approximate the amount of glass fibers contained in the composition. Approximately equal proportions of resin binder and glass fibers are satisfactory for the majority of applications with the balance being clay. In any event the glass to resin ratio should not exceed about 3 to 1.

Of the various inorganic fillers which may be used China clay or kaolin has been found to be the most suitable in combination with glass fibers. China clay has no detrimental effect on the glass fibers and improves the flow characteristics of the composition during molding. Kaolin, likewise, has no tendency to cause separation of the binder from the glass fibers.

A reduction in mold corrosion, improved water resistance and electrical properties of the molded articles is obtained by incorporating in the composition a base of a metal of group 2 of the periodic system having an atomic weight between 10 and 220 in a proportion of about 2% to 20%. Various materials which include the oxides, hydroxides, borates, carbonates and alcoholates such as methoxides and ethoxides of the metals magnesium, calcium, zinc, strontium, cadmium, barium and mercury act as a base toward the polyester, that is to say, the acid end groups of the polyester are neutralized or approximately neutralized by these materials. Of this group, barium carbonate and zinc oxide are preferred. Quantities between about 3% and 10% are somewhat more desirable than the broader range above mentioned but it is to be understood that the upper limit is not critical inasmuch as amounts above that required to react with the acid end groups is not harmful.

It has been found that the method of incorporating filler, a substantial component of which is glass fibers, with alkyd resins of the foregoing type is extremely critical to the successful production of high strength molded articles. Mixing glass fibers with alkyd resins in accordance with procedures which have been hitherto utilized in connection with other fillers such as cellulose, asbestos, etc., is not successful when applied to glass fibers, that is to say, the resulting product does not exhibit any appreciable increase in strength characteristics.

Heat-set articles possessing strengths increased to an unexpected degree have been found to result when alkyd resins are filled with glass fibers in the presence of other filler materials such as clay, slate, mica, talc and anthophyllite in accordance with the essence of the preferred procedure set forth below. Increases in flexural and compressive strengths of approximately 100 percent have been observed in comparison to mineral filled molded alkyd resin articles and an improvement of upwards of 1000 percent is obtained in impact strength when compared to the same materials.

The method of the invention comprises the steps of first adding to the unsaturated polyester, as described above, and the clay type filler an amount of solvent such, for example, as methylene chloride, chloroform, acetone, benzene, and methyl propyl ketone to produce a thin slurry. It is difficult to state the exact amounts of solvent which will be required to produce a thin slurry as the amount of solvent will vary with the amount of filler which is present, but in any case a quantity of solvent should be used such that the glass fibers may easily be mixed into the slurry without requiring vigorous mixing action. A thin slurry which is satisfactory for the purposes of this invention is one having a viscosity of not more than 25,000 centipoises as measured at room temperature on a standard Brookfield viscosimeter. The lower limit is not critical and slurries having the resin, solvent and solids so adjusted as to produce a viscosity in the range of 20 to 1000 centipoises have been found to be superior in use and flexibility of operation.

Second, a suitable polymerization catalyst is added to the slurry. Curing catalysts include peroxides, ozonides (diisobutylene, terpenes, etc.), perhalides, peracids, ozone, phthalylperoxides, acetyl-benzoyl peroxide, etc. The preferred catalyst is benzoyl peroxide in amounts between about 0.1 percent and 10 percent by weight, based on the weight of the polymerizable constituents, with approximately 2 percent being generally satisfactory.

Glass fibers in the above quantities is then added to the slurry and mixed slowly and gently, care being taken that the glass fibers are not subjected to crushing or beating as would occur from the use of conventional mixing apparatus such as Banbury mixers or differential rolls. It has been found suitable to employ a slowly revolving Hobart mixer or the like. Good results are obtained by absorbing the slurry on a mat of glass fibers, and where an excess of slurry is used, no stirring is necessary. Instead of mixing by rotary motion, slowly reciprocating paddles or preferably rods may be utilized. When reciprocatory motion is used, the glass fibers tend to align themselves in parallel relationship to each other and in layers, having a minimum amount of intermeshing with each other. Molded articles containing substantially parallel glass fibers have better strength properties than those produced from compositions which were mixed in a rotary type mixer.

The filled slurry is then dried in air or with the application of heat to remove the solvent. Upon drying, the superior molding composition of this invention is obtained. The physical form of the thus obtained composition is distinctly different from commonly known granular molding compositions in that the composition is comprised of a heterogeneous mass of conglomerates of varying size, each conglomerate having a discontinuous glass fiber phase. The glass fibers tend to render the material straw-like so that it is air permeable, and it is believed that this air permeability is largely responsible for the stability of the composition.

In general, the mixing of the filler containing glass fibers and the thinned alkyd resin slurry should be so performed that the glass fibers after mixing remain substantially unbroken and the surfaces thereof remain substantially free of abrasion.

Another procedure which has been found to be satisfactory comprises drawing a continuous glass fiber strand through the alkyd resin slurry, then removing the solvent and chopping the coated strand into lengths suitable for molding. The alkyd resin slurry concentration is properly adjusted to control the amount of resin which adheres to the glass fiber strand and this is accomplished by varying the consistency of the slurry. When using this procedure the viscosity may be increased to an upper limit approximating 100,000 centipoises. It is thought that the increased viscosity tends to impart thixotropic properties to the slurry which are beneficial in preventing drainage of the coating from the glass fiber strands. After drying and chopping the molding composition resulting from this alternate procedure is in the form of spaghetti-like material having lengths of ½" to 2".

Any type of glass fiber has been found to be of benefit when added to alkyd resins in accordance with this invention, but it is preferred to use drawn glass fibers having lengths between about ¼" and 2". Better results are obtained by using fibers having lengths between about ¼" and 1" and the most desirable length is about ½". It is not necessary that all fibers be the same length and mixtures of lengths may be used, but when mixtures of lengths are employed, it is preferable to have a predominance of shorter fibers. Fibers having a very small diameter are desirable—for example, in the range of .0001" to about .001". It is more desirable to use fibers having diameters not greater than about .0004", and in any case, it is preferred that the predominance of the fibers be not more than .0004" in diameter. The fibers are preferably in the form of strands, each strand being made up of a multiplicity of untwisted individual fibers or filaments, for the reason that the strand form eliminates the difficulty encountered with fluffing when using individual fibers. Fibers which have been employed successfully are known in the trade as chopped strand mat and are available from the Owens-Corning Fiberglas Corporation.

Further improvements in strength characteristics as well as increased resistance to water have been observed when the individual glass fibers are treated after drawing with a water repellant chrome-organic complex such as a methacrylato chromic chloride complex sold under the trade name Volan and supplied by E. I. du Pont de Nemours and Company. This complex may be represented as

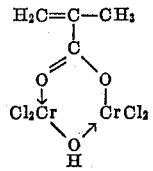

Fibers coated with other lubricants such as starch binders which may contain starch, gelatin, vegetable oil, and a suitable emulsifier are also satisfactory, and although the products made with these fibers are more subject to failure in humid conditions, they are more desirable in some applications such as those requiring extremely high impact strength. Starch coated fibers form a less brittle product than chromic chloride complex fibers. The fibers may also be coated with polyvinyl acetate or certain silicone resins such as allyl silanol, diallyl silanol or derivatives which will give unsaturated silanols, e. g. allyl trichlorosilane, etc. In the case of the methacrylato chromic chloride complex coated fibers, a chemical bonding is believed to occur between the methacrylic components and the alkyd resins as well as a physical bonding, and the same is believed to be true in relation to the silicones.

The following typical formulations are given by way of example to illustrate the composition and method of this invention in greater detail. All percentages are by weight, and the formulations include, in addition to the constituents shown, a common molding lubricant such as a metallic soap or mixture of metallic soaps in an amount of about 2% of the total composition.

EXAMPLE I

| | I Percent |
|---|---|
| Unsaturated polyester | 34.6 |
| Diallyl phthalate | 3.8 |
| Peroxide catalyst | 1.6 |
| China clay | 15 |
| Barium carbonate | 5 |
| Glass fibers—⅞" chrome treated | 40 |

The above formulation was compounded in accordance with the above described method with the exception that no organic solvent was added to the resin portion of the formulation and the glass fibers were mixed in a conventional type mixer. Articles molded from the composition were found to have the following properties:

| Flexural Strength, p. s. i. | Compressive Strength, p. s. i. | Impact Strength Normal to Pressure, ft. lbs. per inch of notch | Impact Strength Parallel to Pressure, ft., lbs. per inch of notch |
|---|---|---|---|
| 10,900 | 19,900 | 2.5 | 2.2 |

EXAMPLE II

A formulation having a composition identical to that of Example I was compounded by adding 35% acetone to the resin constituents prior to the incorporation of the glass fibers therewith in a slowly revolving Hobart mixer. Molded articles of this composition were found to have good appearance and luster and the following physical properties:

| Flexural Strength, p. s. i. | Compressive Strength, p. s. i. | Impact Strength Normal to Pressure, ft. lbs. per inch of notch | Impact Strength Parallel to Pressure, ft., lbs. per inch of notch |
|---|---|---|---|
| 26,800 | 25,800 | 21 | 14 |

EXAMPLE III

| | I Percent |
|---|---|
| Unsaturated polyester | 34.6 |
| Diallyl phthalate | 3.8 |
| Benzoyl peroxide catalyst in tricresyl phosphate carrier | 1.6 |
| China clay | 15 |
| Barium carbonate | 5 |
| Glass fibers—⅞" chrome treated | 40 |

A large excess of acetone was added to the resin constitutents and the glass admixed therewith as in Example II. The mixed mass was then poured in a tray and allowed to settle to produce a matted product. Molded articles were found to have good appearance and luster and physical properties comparable to those of Example II.

The effect of varying the glass to resin ratio in the composition is illustrated by the following series of formulations all of which were compounded in accordance with the preferred procedure described above. Acetone was used as the solvent.

Table I

| | I | II | III | IV |
|---|---|---|---|---|
| | Percent | Percent | Percent | Percent |
| Unsaturated Polyester | 31.9 | 23.8 | 19 | 33.8 |
| Diallyl Phthalate | 3.4 | 2.6 | 2.1 | 3.7 |
| Peroxide Catalyst | 1.4 | 1.1 | .91 | 1.5 |
| Clay | 18.3 | 27.5 | 33 | 26 |
| Barium Carbonate | 5 | 5 | 5 | 5 |
| Glass Fibers | 40 (1" starch) | 40 (1" starch) | 40 (1" starch) | 30 (1" starch) |

The above compositions were found to have the following properties after molding:

|   | Flexural Strength, p. s. i. | Compressive Strength, p. s. i. | Impact Strength Normal to Pressure, ft. lbs. per inch of notch | Impact Strength Parallel to Pressure, ft. lbs. per inch of notch |
|---|---|---|---|---|
| I | 23,600 | 16,400 | 24 | 17 |
| II | 17,400 | 18,600 | 17 | 15 |
| III | 14,500 | 13,900 | 16 | 14 |
| IV | 18,600 | 21,800 | 9 | 8 |

A further series of compositions were formulated in the same manner employing varying lengths and types of surface treatment of the glass fibers, as illustrated below:

Table II

|   | I | II | III | IV | V | VI |
|---|---|---|---|---|---|---|
|   | Percent | Percent | Percent | Percent | Percent | Percent |
| Unsaturated Polyester | 31.8 | 37.5 | 34.6 | 34.6 | 34.6 | 35.8 |
| Diallyl Phthalate | 3.5 | 4.2 | 3.8 | 3.8 | 3.8 | 3.6 |
| Peroxide Catalyst | 1.4 | 1.6 | 1.6 | 1.6 | 1.6 | 1.5 |
| Clay | 18.3 | 21.7 | 20 | 15 | 15 | 20.7 |
| Barium Carbonate | 5 | 5 | 5 | 5 | 5 | 5.5 |
| Glass Fibers | 40(½″ starch) | 30(¾″ chrome) | 5(⅞″ chrome) 30(7/16″ chrome) | 40(⅞″ starch) | 40(⅞″ chrome) | 32.9(½″ chrome) |

The formulations of Table II produced satisfactorily cured articles having good appearance and luster. In general it was indicated that fiber lengths approximating ½″ in length were most satisfactory and that glass fibers having the chrome treated surfaces produced somewhat better strength properties.

Varying proportions of esters containing at least one allyl group in the binder portion of the composition were evaluated in the below series of formulations:

Table III

|   | I | II | III | IV |
|---|---|---|---|---|
|   | Percent | Percent | Percent | Percent |
| Unsaturated Polester | 14 | 26.9 | 24 | 41.6 |
| Diallyl Phthalate | 5 | 11.5 | 18 | None |
| Peroxide Catalyst | 1 | 1.6 | 1.8 | 1.7 |
| Clay | 35 | 15.0 | 20 | 16.7 |
| Barium Carbonate | 5 | 5 | 5 | 5 |
| Glass Fibers | 40 (½″ starch) | 40 (1″ starch) | 31.2 ½″ chrome) | 35 (½″ chrome) |

The above formulations produced, upon molding, articles having good luster, appearance and physical properties. The absence of diallyl phthalate in formulation IV produced slightly inferior flexural strength than that of formulations I, II and III but still well above that obtained in Example I.

Variations in the solvents and the use of other catalysts are illustrated in Table IV. Molded articles produced from these formulations were comparable in appearance and physical properties to the highly desirable formulations of Example I and Table I.

Table IV

|   | I | II | III |
|---|---|---|---|
|   | Percent | Percent | Percent |
| Unsaturated Polyester | 31.9 | 31.9 | 35.3 |
| Diallyl Phthalate | 3.5 | 3.5 | .4 |
| Catalyst | 1.4 (Peroxide) | 1.4 (Peroxide) | .8 (t-butyl) Perbenzoate |
| Clay | 18.3 | 18.3 | 20 |
| Barium Carbonate | 5 | 5 | 5 |
| Glass Fibers | 40 (½″ starch) | 40 (½″ starch) | 35 (½″ chrome) |
| Solvent | Methylene Chloride | Chloroform | Acetone |

Mineral fillers other than China clay were employed in the formulations of Table V. No detrimental effects were found to result from this substitution.

Table V

|   | I | II | III | IV |
|---|---|---|---|---|
|   | Percent | Percent | Percent | Percent |
| Unsaturated Polyester | 51.8 | 34.6 | 34.6 | 34.6 |
| Diallyl Phthalate | 5.7 | 3.8 | 3.8 | 3.8 |
| Peroxide Catalyst | 2.4 | 1.6 | 1.6 | 1.6 |
| Filler | None | 20 mica | 10-clay, 10-anthophyllite | 20 anthophyllite |
| Barium Carbonate | 5 | 5 |  | 5 |
| Glass Fibers | 35 (½″ chrome) | 35 (½″ chrome) |  | 35 (½″ chrome) |

What is claimed is:

1. A method for making filled alkyd resin molding compositions which comprises the steps of adding to a mixture of a polymerizable unsaturated alkyd resin and a finely divided mineral filler a suitable solvent to produce a thin liquid having a viscosity less than 25,000 centipoises, adding a small amount of a polymerization catalyst, incorporating glass fiber strands ¼″ to 2″ in length, each composed of a multiplicity of individual untwisted glass fibers .0001″ to .001″ in diameter into the said liquid by a mixing operation which stratifies the bulk of the said strands without substantial intermeshing thereof and which does not substantially abrade the surfaces of the said fibers and thereafter removing the excess solvent to form a substantially dry mass which is freely permeable by air.

2. The method in accordance with claim 1 wherein the surfaces of the said glass fibers are treated with an unsaturated silanol.

3. A method for making filled alkyd resin molding compositions which comprises the steps of mixing a polymerizable unsaturated alkyd resin obtained by reacting ingredients including a dihydric alcohol and an alpha beta unsaturated dicarboxylic acid, a compatible polymerizable ester of a polycarboxylic acid containing at least one allyl group, and a finely divided mineral filler, diluting the said mixture to a thin slurry having a viscosity less than 25,000 centipoises with a suitable solvent, incorporating with the said slurry a small amount of a polymerization catalyst, admixing glass fiber strands ¼″ to 1″ in length, each composed of a multiplicity of individual untwisted glass fibers .0001″ to .001″ in diameter with the said slurry by a gentle mixing operation which stratifies the bulk of the said strands without substantial intermeshing thereof and which does not substantially abrade the surfaces of the said fibers, and thereafter removing the excess solvent to form a dry, somewhat loose mass of stratified structure which is freely permeable by air.

4. In a method for making filled alkyd resin molding compositions containing an alkyd resin obtained by reacting maleic acid and a dihydric alcohol and thereafter admixing the reaction product with a compatible polymerizable polyallyl ester of a polybasic acid and a finely divided mineral filler, the steps of diluting the said mixture with a suitable solvent to form a thin slurry having a viscosity of less than 25,000 centipoises, admixing glass fiber strands ¼" to 1" long each composed of a multiplicity of individual untwisted glass fibers having a diameter in the range .0001" to .001" with the said slurry without excoriating the surfaces of the said glass fiber strands by a gentle mixing operation which stratifies the bulk of the said strands without substantial intermeshing thereof, and removing said solvent to form a substantially dry mass of stratified structure which is freely permeable by air.

5. A method for making a high strength resinous product which comprises mixing a polymerizable, unsaturated alkyd resin made by reacting maleic acid with a glycol until a product having an acid number between 15 and 100 is produced with diallyl phthalate and a kaolin, diluting the mixture with a solvent selected from the group consisting of methylene chloride, chloroform, acetone, benzene and methyl propyl ketone to form a liquid having a viscosity in the range of 20 to 1,000 centipoises, adding a small amount of a polymerization catalyst, mixing glass fiber strands ¼" to 1" long each composed of a multiplicity of individual untwisted glass fibers .0001" to .001" in diameter with the thin liquid to produce a stratified product and without excoriating the surfaces of the said glass fiber strands, removing the excess solvent to produce a molding composition in the form of a mass of conglomerates in which the said strands are stratified and which is freely permeable by air, and thereafter polymerizing the said molding composition.

6. A method for making filled alkyd resin molding compositions which comprises the steps of mixing a polymerizable unsaturated alkyd resin obtained by reacting ingredients including a dihydric alcohol and an alpha beta unsaturated dicarboxylic acid, a compatible, polymerizable ester of a polycarboxylic acid containing at least one allyl group and a finely divided mineral filler, diluting the said mixture to a thin liquid having a viscosity less than 100,000 centipoises with a suitable solvent, incorporating with the said liquid a small amount of a polymerization catalyst, drawing a continuous strand of glass fibers through the said liquid mixture whereby a coating is formed on the said strand, drying the said coating and thereafter chopping the said coated strand into lengths between ¼" and 2".

7. A method for making filled alkyd resin molding compositions which comprises the steps of adding to a mixture of a polymerizable unsaturated alkyd resin and a finely-divided mineral filler a suitable solvent to produce a slurry of a viscosity permitting incorporation of glass fiber without vigorous mixing, adding a small amount of a polymerization catalyst, incorporating glass fiber strands each composed of a multiplicity of untwisted glass fibers .0001" to .001" in diameter into the said slurry by a mixing operation which does not abrade the surfaces of the said fibers and which does not separate and entangle the said individual strands, removing the said solvent from the said slurry and putting the resulting product in a physical form in which the glass fiber strands have a length of form ¼" to 2" in length and which is freely permeable by air.

References Cited in the file of this patent

UNITED STATES PATENTS

| 1,541,336 | Ellis | June 9, 1925 |
| 2,288,321 | Nordlander et al. | June 30, 1942 |
| 2,563,288 | Steinman | Aug. 7, 1951 |
| 2,632,751 | Anderson | Mar. 24, 1953 |

FOREIGN PATENTS

| 540,168 | Great Britain | Oct. 8, 1941 |

OTHER REFERENCES

Chemistry of Synthetic Resins, by Ellis, vol. 2 (1935), pages 1272–1273.